Figure 1:
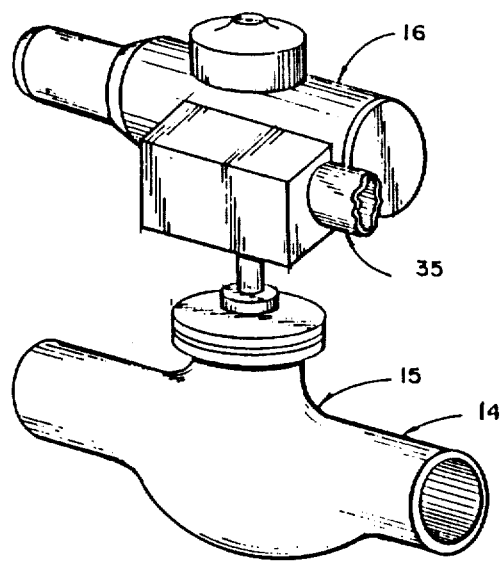

United States Patent [19]

McNennamy et al.

[11] Patent Number: 4,690,003

[45] Date of Patent: * Sep. 1, 1987

[54] MOTOR OPERATED VALVE ANALYSIS AND TESTING SYSTEM

[75] Inventors: John A. McNennamy, Cobb; Steven Nafziger, Gwinnett, both of Ga.

[73] Assignee: Charbonneau & Godfrey Associates, Marietta, Ga.

[*] Notice: The portion of the term of this patent subsequent to Sep. 24, 2002 has been disclaimed.

[21] Appl. No.: 741,861

[22] Filed: Jun. 6, 1985

Related U.S. Application Data

[63] Continuation of Ser. No. 515,358, Jul. 19, 1983, Pat. No. 4,542,649.

[51] Int. Cl.[4] .................. G01M 19/00; G01L 5/00
[52] U.S. Cl. .................. 73/862.32; 73/168
[58] Field of Search .......... 73/168, 862.19, 862.27, 73/862.31, 862.32; 137/552, 551; 251/129.03

[56] References Cited

U.S. PATENT DOCUMENTS

| | | | |
|---|---|---|---|
| 1,734,419 | 11/1929 | Chitty | 137/552 X |
| 1,908,763 | 5/1933 | Kelty | 137/552 |
| 1,979,340 | 11/1934 | Norman | 73/862.19 |
| 2,007,658 | 7/1935 | Panish | 137/552 X |
| 2,155,674 | 4/1939 | Morgan et al. | 73/862.31 X |
| 3,345,486 | 10/1967 | Colclase, Jr. et al. | 251/129.03 X |
| 3,675,538 | 7/1972 | Keller et al. | |
| 4,085,624 | 4/1978 | Nomura | 74/89.15 |
| 4,193,720 | 3/1980 | Machida | 73/862.33 X |
| 4,194,393 | 3/1980 | Boley | 73/862.19 X |
| 4,255,967 | 3/1981 | Grymonprez et al. | 73/168 |
| 4,261,224 | 4/1981 | Sulzer | 74/626 |
| 4,435,979 | 3/1984 | Gilgore | 73/168 |
| 4,454,504 | 6/1984 | Jocz | 73/862.31 X |
| 4,523,286 | 6/1985 | Koga et al. | 137/551 X |
| 4,542,649 | 9/1985 | Charbonneau et al. | 73/862.32 X |
| 4,566,310 | 1/1986 | Cohen et al. | 73/168 X |
| 4,570,903 | 2/1986 | Crass | 73/862.31 |
| 4,660,416 | 4/1987 | Charbonneau et al. | 73/168 |

FOREIGN PATENT DOCUMENTS

| | | | |
|---|---|---|---|
| 649617 | 12/1928 | France | 73/862.31 |
| 173182 | 7/1965 | U.S.S.R. | 73/168 |

OTHER PUBLICATIONS

"Electronic Torque Monitoring for Valve Drives"; vol. 60, pp. 169-171, *Sulzer Technical Review;* Apr. 1978, F. König.

*Primary Examiner*—Tom Noland
*Attorney, Agent, or Firm*—Louis T. Isaf

[57] ABSTRACT

A valve analysis and testing system includes various devices for measuring the operating characteristics of a valve and its operator and the corresponding imposed valve stem load, which devices are attached to the valve operator. These devices provide for statically calibrating the operator relative to the imposed valve load and provide recording traces of the imposed load and associated parameters during dynamic conditions as related to the operation of the operator and valve combined. The system provides initial dynamic traces after initial assembly, maintenance and/or periodic testing of the operator and valve. The system is then used to provide diagnostic dynamic traces at any specified time in the future for the operator and valve. These future traces are used to compare with earlier traces to verify correct performance and most importantly to detect induced or impending damage, malfunctions, or maintenance requirements for the operator and valve.

32 Claims, 10 Drawing Figures

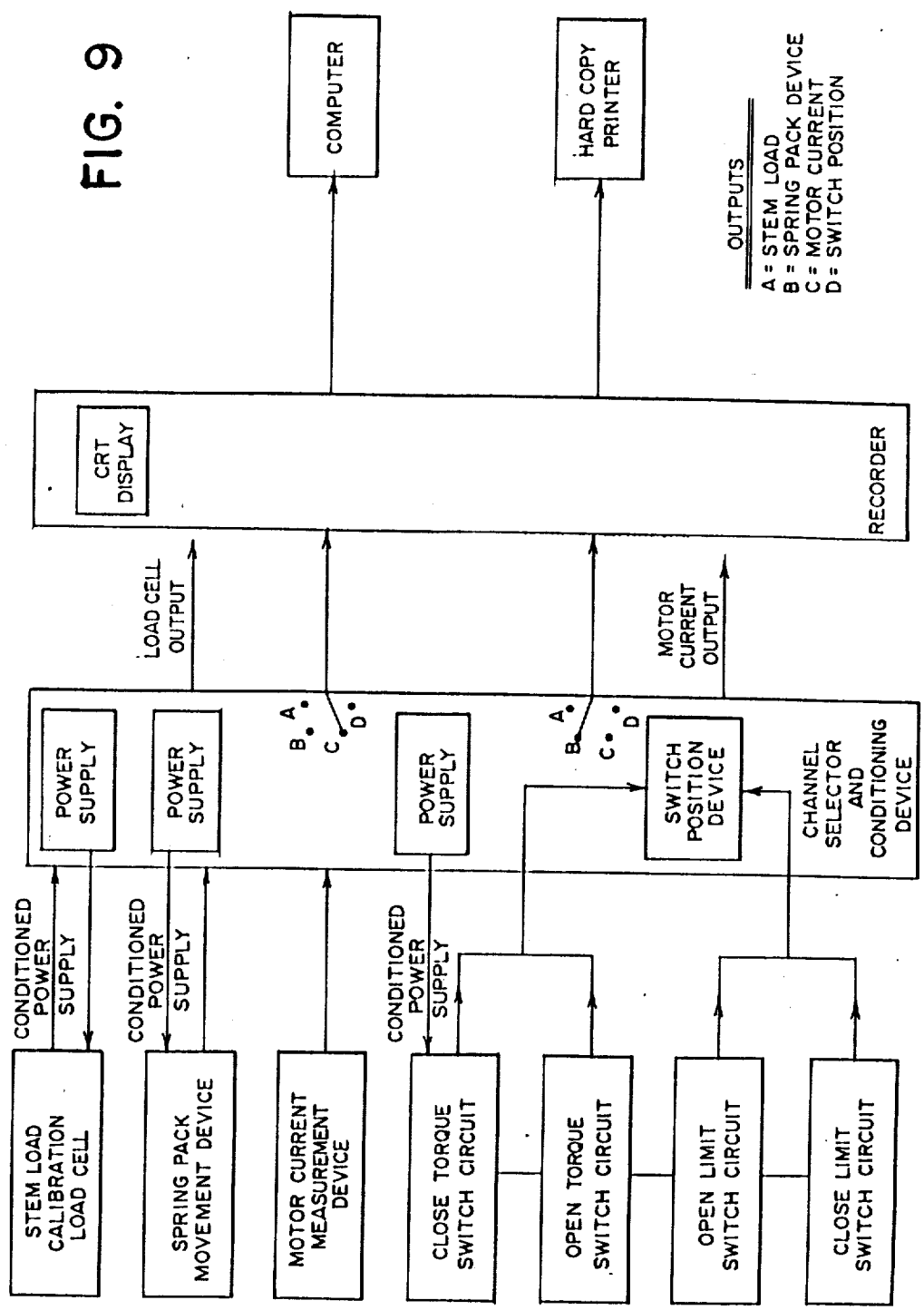

4,690,003

MOTOR OPERATED VALVE ANALYSIS AND TESTING SYSTEM

This application is a continuation of application Ser. No. 515,358, filed July 19, 1983, now U.S. Pat. No. 4,542,649.

BACKGROUND OF THE INVENTION

This invention generally relates to a system by which the overall performance and actual thrust loads delivered by an electromechanical, mechanical, pneumatic or hydraulic valve operator can be statically and dynamically monitored.

The conditions giving rise to the problems solved by this invention are commonly found in industries utilizing externally driven valves. In particular within the power industry, valves are operated remotely from open, closed and intermediate positions to improve or maintain utility power plant output, or in many cases provide for the protection of plant equipment, as well as protection of the general public from release of radioactive materials either directly or indirectly. Continual proper operation of these valves is essential to industries and the general public.

Typically these valves are required to operate under differing operating conditions of temperature, pressure and flow within the common requirement for consistent operation. Further, the inherent operating characteristics of the valve and operator are constantly undergoing mechanical or electrical changes from maintenance, repair, adjustments, calibration and wear.

In the earlier state of the art, remote and local externally operated valves have been tested and calibrated to demonstrate that the operator will deliver the minimum or maximum thrust loads to the valve stem under static conditions. The prior state of the art did not provide verification that the static load delivered by the operator was acceptable after field assembly or maintenance, nor did the prior art provide any verification of the imposed valve load under dynamic conditions.

Historically, the thrust required to open or shut and subsequently to seat a valve was determined analytically by considering such factors as temperature, pressure, pressure drop, flow, liquid, valve type, packing load, motor voltage and valve mechanical characteristics. Once the minimum and maximum valve thrust requirements were determined analytically, the valve operator size could then be selected. Normally, motor operated valves in nuclear power plants, which perform a safety function, are required to operate between seventy-five and one hundred-ten percent (75-110%) of nominal line voltage applied to the operator. This requirement could lead to sizing of operator motors which can deliver from 1.0 to 2.5 times the required valve stem thrust, depending upon the actual line voltage. With oversized motors and operators, the load imposed on the valve is typically much larger than anticipated or estimated by static means, due to the inherent motor/operator inertia effects. Prior state of the art methods for minimizing the effects of dynamic or inertia forces involved the use of torque switches, motor brakes or compensating springs. Although these devices provided some relief, they do not preclude excessive or inadequate thrust loads being delivered to the valve stem, seat and body. Complicating this situation is the fact that when a valve leaks, common practice has been to increase the force delivered to the valve stem through increased torque switch adjustments. Studies have shown that this approach subsequently leads in many cases to irrevocable damage to the valve or inoperativeness and more importantly degradation of system reliability as a whole.

The basic shortcoming of the prior art-load limiting devices is that they are not diagnostic in nature and, as in the the case of the torque switch, provide an element of protection which does not take into account the dynamic considerations of the valve and operator during actual operation. Changing effects on valve load under dynamic conditions such as line voltage, packing tightness, gear train wear, lubrication degradation, calibration, and adjustment errors cannot be identified with the earlier state of the art devices. Further, in most cases, prior state of the art post-maintenance valve and operator actuation testing will not identify progressive degradation of valve performance.

A SUMMARY OF THE INVENTION

Briefly described, the present invention comprises a modification to the prior state of the art, which includes the addition of a device(s) which will measure motion of the operator drive system continuously and provide a dynamic trace of the actual load being delivered to the valve throughout the operation cycle. After initial calibration, the recorded trace will provide accurate information upon which more accurate and appropriate load limiting device adjustments can be made. In doing so, increased system reliability and reduced probability of physical valve damage can be obtained. This improvement over the state of the art also provides a means to determine, monitor and test valve and operator performance throughout its cycle, from open to closed positions and vice versa. Information on valve performance, which heretofore, was unavailable from the previous state of the art protection devices, will provide a direct indication of developing valve and operator problems such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation. All of the above forms of valve and/or operator degradation will be apparent from data records obtained from load, current, and continuity devices, which form part of the total analysis and testing hardware of the invention, described in more detail to follow. Knowledge of the above actual or pending problems will enable the user to take necessary corrective action prior to actual failure of the valve, to perform its intended function. Early corrective action can, therefore, lead to improved system reliability, improved safety, lower maintenance, and repair costs.

The user, of the present invention, will have the capability of testing and monitoring the valve and operator performance remotely, which will reduce personnel radiation exposures in nuclear power plants. Furthermore, the present invention will be of great value to other industry applications such as chemical or hazardous material environments or even to those applications where accessibility to those components is restricted.

The purpose of the present invention, when taken as a whole, is to provide a method by which the general material and operational condition of a valve and its associated operator can be determined and evaluated.

One object of the present invention is to provide an actual dynamic valve operator spring pack movement-time trace.

Another object of the invention is to correlate valve stem load to spring pack movement, and therefore provide a valve stem load-time trace.

Another object of the invention is to provide an operator motor current-time trace that can be correlated with the valve stem load trace.

Another object of the invention is to provide a torque and limit switch on/off-time trace that can be correlated with the valve stem load and motor current traces.

According to one aspect of the invention there is a diagnostic interrelationship between the calibrated valve stem load-time trace, the motor current-time trace, and the torque and limit switch position-time trace.

According to another aspect of the invention the interrelationship of the stem load-time trace, motor current-time trace, and the torque and limit switch position-time trace can be used to verify correct valve stem loads for initial valve and operator installations, or future operational testing of the valve and operator.

An alternate embodiment of the present invention includes a specially designed spring pack movement device to facilitate mounting of the device to the valve operator housing to allow installation and operation of the device in congested areas.

Other objects, features and advantages of the present invention will become apparent upon reading and understanding this specification when taken in conjunction with the accompanying drawings.

A BRIEF DESCRIPTION OF THE DRAWINGS

FIG. 1: A pictoral, partial view of one embodiment of a valve, valve operator, and piping system in accordance with the present invention.

Figure 2:
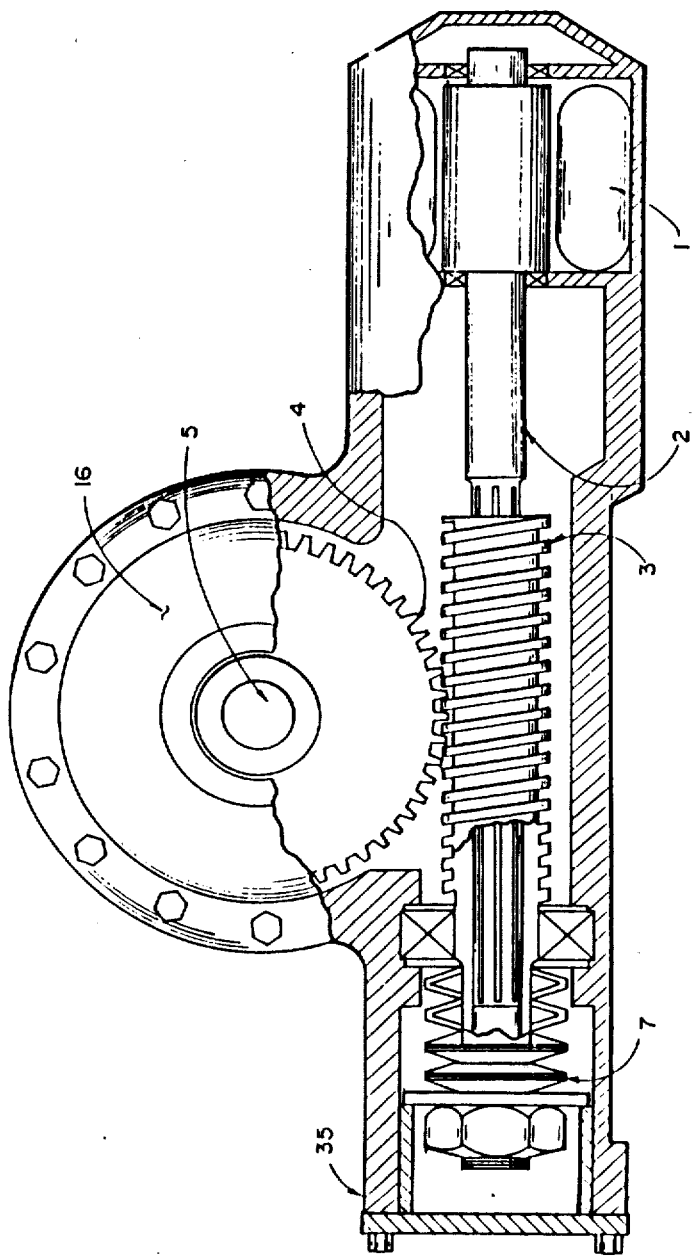

FIG. 2: A cut-away view of a valve operator showing the motor, worm, worm gear, and spring pack arrangement in accordance with the present invention.

Figure 3:
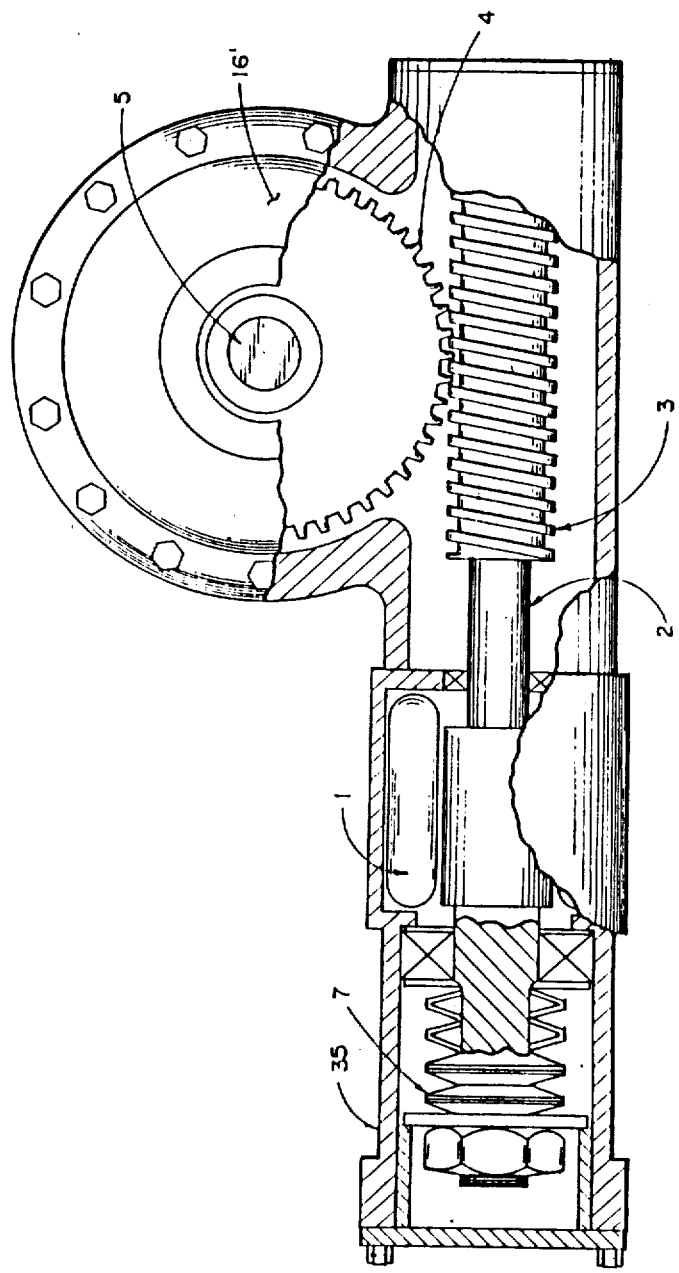

FIG. 3: A cut-away view of a valve operator showing the motor, worm, worm gear, and spring back arrangement, in accordance with the present invention, showing an alternate embodiment to that of FIG. 2.

Figure 4:
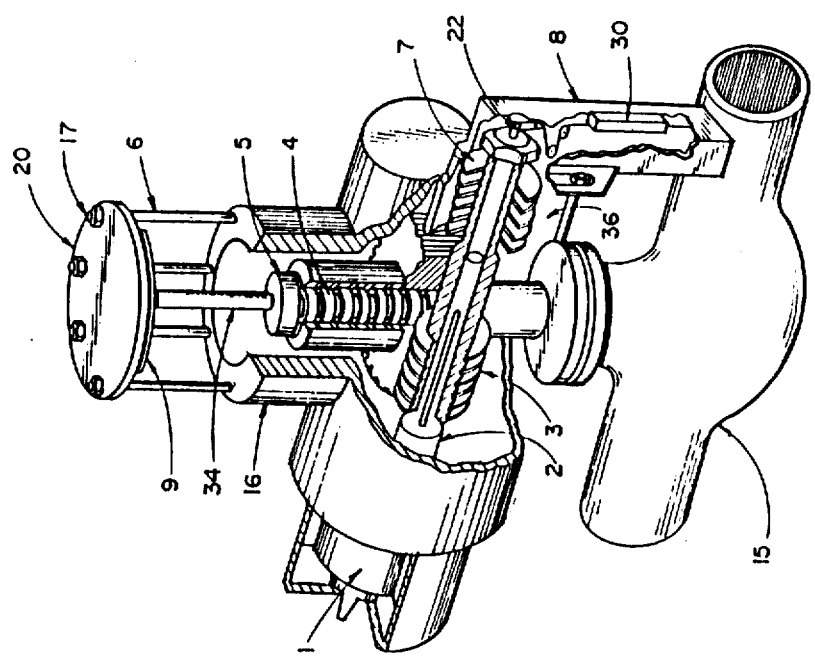

FIG. 4: A cut-away view of a valve analysis and testing system, showing the valve operator of FIG. 2, with the attached stem load calibration device and spring pack movement device in accordance with the present invention.

Figure 5:
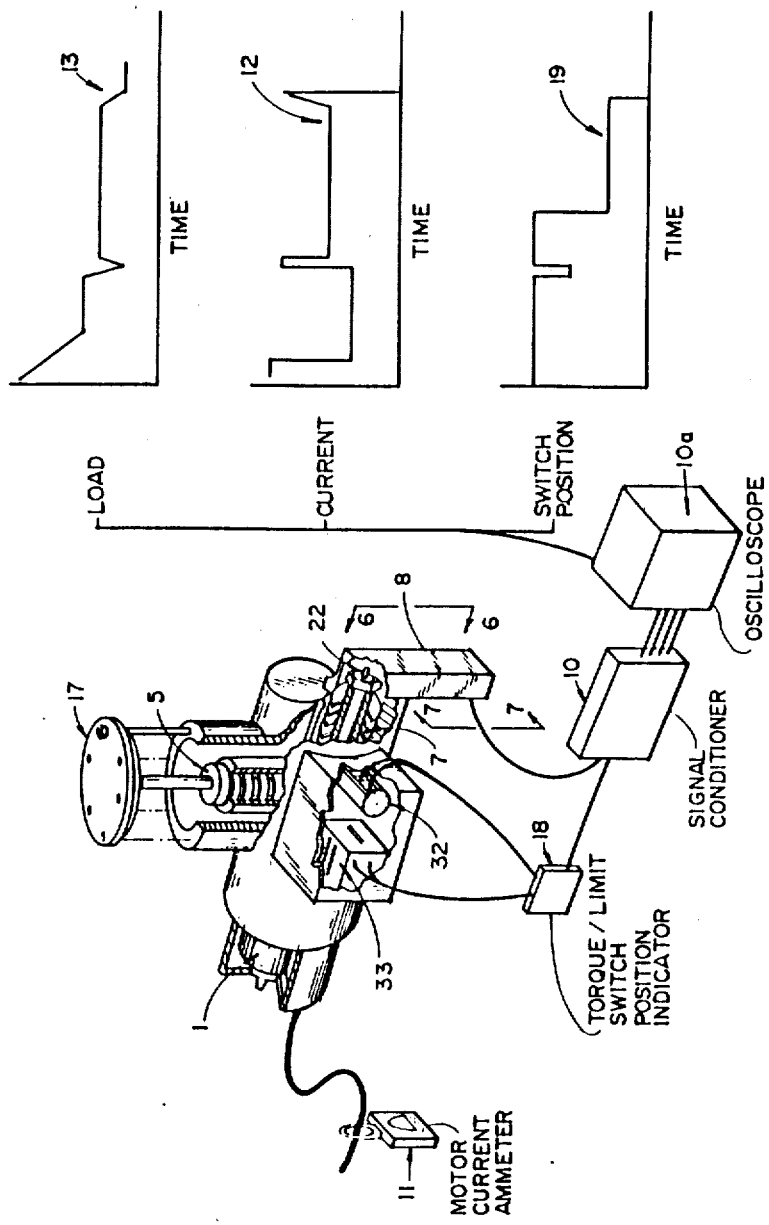

FIG. 5: A schematic representation of a valve analysis and testing system in accordance with the present invention, showing a valve operator with attached diagnostic devices, recording device, and recorded function-time parameters.

Figure 6:
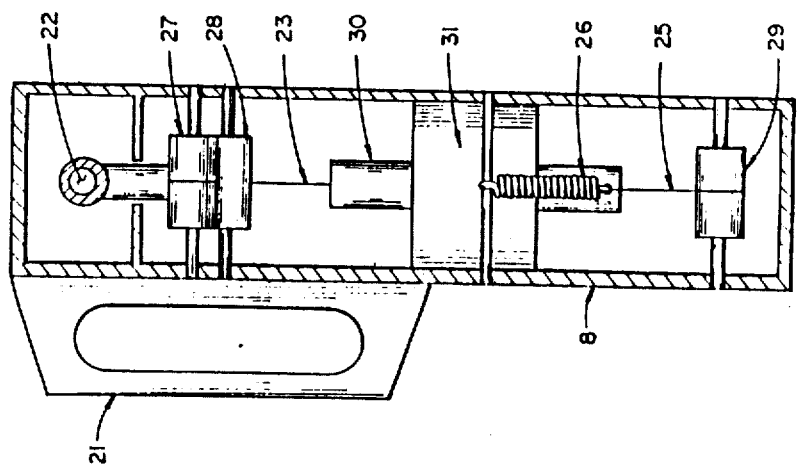

FIG. 6: A cut-away view, taken along line 6—6 of FIG. 5, showing the spring movement device, and related components, in accordance with the present invention.

Figure 7:
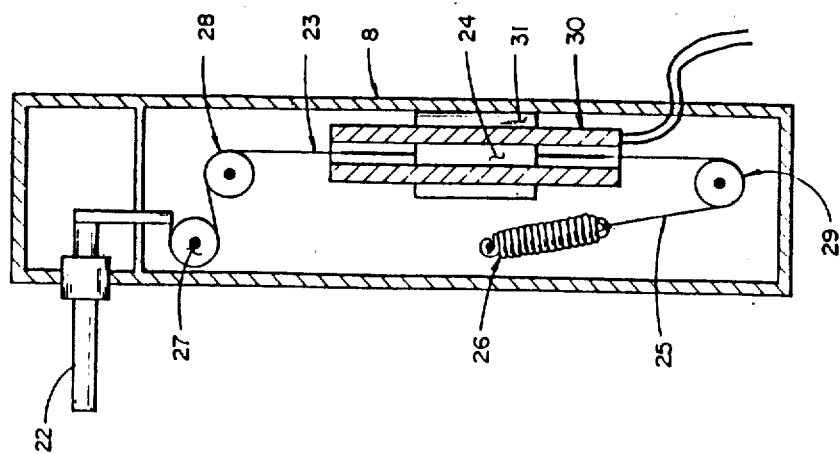

FIG. 7: A cut-away view, taken along line 7—7 of FIG. 5, showing the spring movement device, and related components, in accordance with the present invention.

Figure 8:
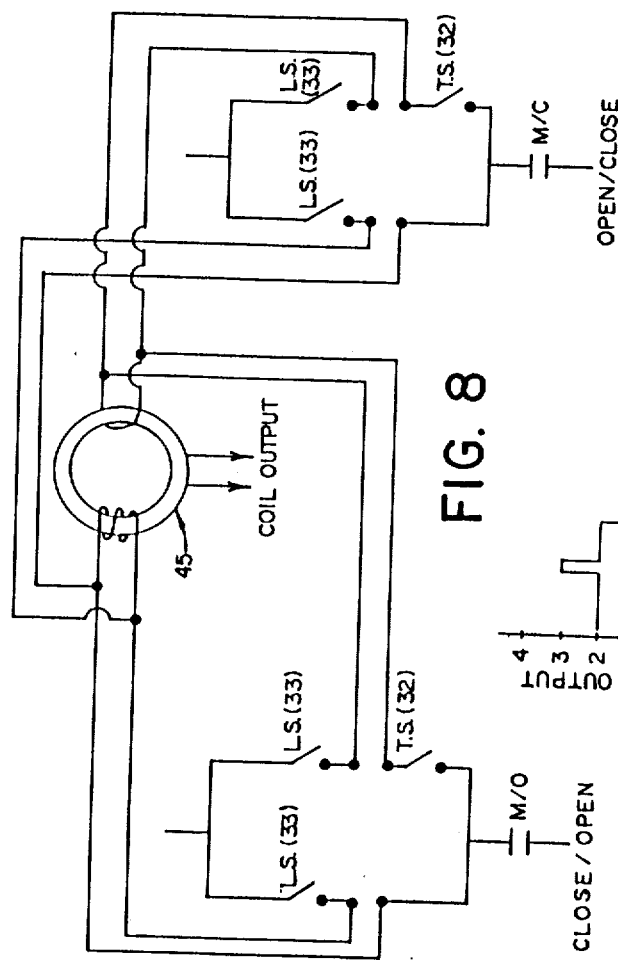

FIG. 8: An electrical schematic showing of the design of the switch position indicating circuitry and sub-components, in accordance with the present invention.

Figure 8A:
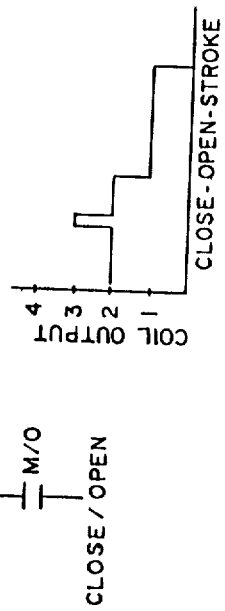

FIG. 8A: A sample trace from the magnetic coil of the limit/torque switch position device, in accordance with the present invention.

FIG. 9: An electrical block diagram showing how the system signals are obtained and processed, in accordance with the present invention.

A DESCRIPTION OF THE PREFERRED EMBODIMENT

Referring now in greater detail to the drawings, in which like numerals represent like components throughout the different views, FIG. 1 shows the environment in which the preferred embodiment of the invention is used. A process pipe 14, having a valve 15, with an attached operator 16 is within an operating system with a prescribed flow, pressure, and temperature. The valve 15 is opened or closed as required for system control, and is opened or closed by the operator 16. The operator 16 can be electromechanical, mechanical, pneumatic, or hydraulic.

FIGS. 2 and 3 show two embodiments of operators 16, 16' used in the present invention. The components of the two FIGS. 2 and 3 are similar although differently arranged. The operators 16,16' are similar to operator and valve stem arrangements typically used in the art. The motor 1 drives a worm shaft 2, which in turn drives a worm 3, which in turn drives a worm gear 4, which in turn drives the valve stem 5, to open or close the valve 15. A reaction device to the actual stem thrust and inertia of the motor and other operator components is shown as a cluster of compression springs or spring pack 7 provided at one end of the worm shaft 2, as shown in FIGS. 2 and 3. When the valve 15 closes or opens, the valve stem 5 will abruptly stop and even though the current to the motor 1 is interrupted, the rotational and kinetic energy of the system will cause the worm gear 4 to induce additional loads on the valve stem 5. In order to absorb some of this energy, the spring pack 7 is provided and is compressed by the worm shaft 2 as the inertia of the system attempts to move the valve stem 5.

FIG. 5 shows a stem load calibration device 17, and a spring pack movement device 8, which are used to calibrate the spring pack 7 movement relative to the imposed load on the valve stem 5. This calibration and correlation is accomplished by a simultaneous inducement of a load into the operator through the worm shaft 2, and tracing the actual stem 5 load and spring back 7 movement through the use of a calibrated load cell 9 and linear velocity differential transducer (LVDT) 30.

SPRING PACK MOVEMENT DEVICE 8

The Spring Pack Movement Device 8 is shown in detail in FIGS. 6 and 7. Its function is to monitor both statically and dynamically the linear motion of the operator spring pack 7. FIGS. 6 and 7 show the significant components and operation of the spring back movement device 8. With reference to FIGS. 1, 4, 5, 6, and 7, the spring pack movement device 8 and attached mounting bracket 21 is bolted directly onto the spring pack housing 35, which is an integral part of the operator 16. The extension rod 22 is pressed against the spring pack 7 by the tension system consisting of the small diameter wire 23, attached to the extension rod 22, the LVDT core 24 attached to the wire 23, wire 25, and the spring 26. The tension system including the spring 26 force is designed such that the rapid movement of a given spring pack 7 does not produce inertia forces in the tension system that would allow separation of the extension rod 22 and spring pack 7. The LVDT core 24 is mounted in a commercially available linear voltage differential transducer 30, which is supported by bracket 31. The drum wheels 27, 28, and 29 are used, and so located, to convert the translation of the extension rod 22 into axial movement of the LVDT core 24, inside the LVDT 30. Thus, the spring pack 7 movement is traced electronically and this movement is displayed on an analytical device such as an Oscilloscope 10a (FIG. 5), hereinafter known generally as the recorder 10a.

STEM LOAD CALIBRATION DEVICE 17

The purpose of this the Stem Load Calibration Device 17 is to initially correlate the movement of the spring pack 7 to the actual load being delivered to a valve stem 5. Stem load can be calibrated to linear displacement of the spring pack 7 since one is merely a reactor to the other. The calibration device 17 is a structure, preferably of steel, comprised of multiple support rods 6 and a drilled flat circular plate 20. On the underside of the plate is fastened a calibrated load cell 9, which is a well known device in the state of the art. The calibration device 17 sits above the valve operator body 16. When an extension shaft 34 is then placed between the lower surface of the load cell 9 and the upper valve stem 5 surface, a load can be induced on the stem 5 by inputing torque via the worm shaft 2.

CHANNEL SELECTOR AND SIGNAL CONDITIONER DEVICE 10

The purpose of the channel selector and signal conditioner device 10 is as follows:
(Refer to FIG. 5.)
1. Provide a conditioned power supply for the LVDT of the spring pack movement device 8, for load cell 9 and torque/limit switch position indicating device 18.
2. House the electronic circuitry (see FIG. 8) for the detection of the limit and torque switch position. This circuit will be discussed in more detail to follow.
3. Provide the necessary sub-components for switching capabilities to enable the user to output any of the following signals to the data collection system; spring pack movement, load cell, motor current, and torque/limit control circuit switch position.
4. Provide input and output connections for an external motor current measuring device 11.
5. Provide local digital readout capabilities for the load cell 9 and spring back movement device 8.
6. Provide a load cell 9 calibration circuit and output signal for verifying proper operation of the recording device 10a.

LIMIT/TORQUE SWITCH POSITION DEVICE 18

The limit/torque switch position device 18 comprises a sensing circuit and associated electronics which are housed in the channel selector and conditioning device 10. As can be seen from the electrical schematic diagram, FIG. 8, the circuit will provide a varying output to the recording device 10a depending on which of the switches (limit 33, or torque 32) are closed or opened. It should be noted that if valve 15 is being operated, only one of the contacts identified as MC or MO (FIG. 8) will be closed, depending on whether the valve is being opened or closed. A sample trace from the magnetic coil 45 is shown in FIG. 8A for ease of understanding. Note that the variable output shown in the sample trace is obtained by looping the signal wire from one side of the parallel control circuit around the magnetic coil more times than the signal wire from the other parallel path. The result of this embodiment of the invention is an output of the recording device 10a, whose magnitude is reflective of which of the two parallel paths, or both, has its associated switches opened or closed.

CURRENT MEASURING DEVICE 11

The current measuring device 11 is used to monitor the current draw of the valve operator motor 1 during the operation of the valve 15. The power required to operate valve 15 can be directly correlated to the actual delivered stem thrust of the operator 16, and thus, corresponding traces (curves) for the stem load 13 and motor current 12 will be obtained. By initial comparison of the two curves 12 and 13, the user can subsequently obtain either one of the signature traces 12 or 13, and have sufficient information on the performance of the valve/operator assembly. The desirability of the current signature traces 12 lies in the fact that it is generally easier to obtain than the stem load curve 13. The component which is preferably used to obtain the motor current trace 12 is a clamp-on ampmeter 11 which is well known to those familiar with the state of the art. The signal output of the motor current measuring device 11 is sent to the channel selector and conditioning device 10 which has been described previously.

RECORDER 10a

The recorder 10a is intended to acquire and store the input data for subsequent display on a screen, or hardcopy printer, for analysis and/or record purposes. Typical recording devices 10a used for the above purposes are well known to those familiar with the state of the art.

The interrelationship of the above described components of the preferred embodiment of the valve analysis and testing system of the present invention is shown in FIG. 5.

An electrical block diagram of the invention is provided as FIG. 9, to show how the electrical signals are obtained and processed by each of component parts, also, referred to as component sub-systems.

Referring to FIG. 5 and having established the valve stem 5 load and spring pack 7 movement relationship and connecting the spring pack movement device 8 to the channel selector and conditioning device 10, the spring pack 7 movement (which is indicative of actual stem load) as a function of time can be recorded as a stem load trace 13 for any operation cycle of the valve. In addition, the motor current measuring device 11 is given to provide a current trace 12, and can be correlated to the stem load trace 13 for further operator and valve performance evaluation, as defined later.

As seen in FIGS. 4 and 5, the valve operator 16 includes a torque switch 32 and limit switch 33 (located within the indicated housing, but not seen here), which are connected and function in a manner known in the art. A torque/limit switch position indication device 18 is electrically wired into the torque switch 32 and limit switch 33 control circuit, as shown in FIG. 8. The output from the torque/limit switch position device 18 is connected to the recording device 10a, via the channel selector and conditioning device 10, which in turn provides a switch on-off-time trace 19, also called torque/limit switch position-time trace 19, for the duration of the operator cycle.

When the spring pack measuring device 8, motor current measuring device 11, and the torque/limit switch position indication device 18 are activated simultaneously and recordings of each, with reference to the same operator cycle-time, are obtained the relationship of the recordings provide diagnostic data. To be more specific, since the spring pack 7 movement is calibrated to the valve stem 5 load, the spring pack movement trace is a direct dynamic stem load-time relationship for an operator cycle. Thus, the spring pack trace corresponds to actual stem load. As a result of the correlation, the stem load trace 13 is also a spring pack movement trace 13 and will be used interchangeably in subsequently describing the invention. The current measuring device 11 measures the current required by the operator motor to deliver the stem load and, therefore, the current-time trace 12 is also a record of the valve stem load-time relationship. In addition, the torque/limit switch indicating device 18 provides a switch position indication for the torque and limit switches 32 and 33, therefore the torque/limit switch position-time trace 19 provides a direct indication of the torque and limit switch timing relationship. Most important is that the torque and limit switch "off" indication can be compared to the stem load trace 13 to establish the additional stem loads delivered to the stem by the inertia of the motor and operator 16, after the torque and limit switches 32 and 33, have interrupted the current to the motor. It is recognized that the stem load trace 13 is a direct record of the dynamic valve stem load during the valve operator cycle, and therefore provides confirmation of the actual load imposed on the valve stem 5. If the recorded stem load is less than, or greater than, that required for proper valve operation, the traces 12, 13 and 15, are compared and the comparisons are used to readjust the torque switch 32 and/or limit 33 switch settings, and therefore the stem load to within required limits.

Further a spring pack movement or stem load trace 13, current trace 12, and switch position trace 19, generated from a properly functioning valve and operator combination, can be used as a data base for comparison of subsequent spring pack movement, current and switch position indication traces for purposes of verification of performance, or as a means of detecting improper functioning components of the valve 15 and operator 16.

In preferred embodiments, the process of comparison and analysis of the data is accomplished through the use of computer data bases and specialized programs which calculate and compare critical valve 15 and operator 16 parameters. This historical comparison identifies to the user a slowly degrading condition, which heretofore could not be readily detected between sequential test frequencies.

Typical valve and operator parameters which are determined and compared from the dynamic traces 12, 13 and 19 are as follows:

A. Stem load versus spring pack 7 deflection. Correlation of these two parameters provides the user with a known stem load for a given, subsequently obtained, spring pack movement.
B. Valve packing load changes.
C. Starting stem load to initially move the valve from its closed or open position, commonly known in the state of the art as hammer blow.
D. Total stem load, which is the final observed stem load at the end of a given valve cycle.
E. Available stem load to seat a valve. This load is the difference between the packing and and total stem load.
F. Stem load at which the torque or limit switches actuate. This provides information on the overall operational set-up of a valve and operator control circuitry.
G. Total time for the valve to open or close.
H. General condition of the operator mechanical gearing and stem, by analysis of the valve mid-cycle stem load trace 13.
I. Average motor current requirements, which if it changes, can provide an indication of degrading valve performance.

An example of a computer program, which is part of the invention to perform the above analytical manipulations, is shown following:

This is an example computer program for analysis of motor operated valve spring pack 7 movement, motor current (at current measuring device 11) and torque/limit switch 32 and 33 activation. This program is written for the Norland 3000 DMX computer.

Program listing:

| | |
|---|---|
| 1. | Display B C C'D E'RO DPLY |
| 2. | O > B |
| 3. | O > C |
| 4. | O > C' |
| 5. | O > D |
| 6. | O > E' |
| 7. | O > RO |
| 8. | PAUS |
| 9. | PAUS |
| 10. | O IF > R1 |
| 11. | D DISK 101 |
| 12. | D DISk 102 |
| 13. | D DISK 103 |
| 14. | D DISK 104 |
| 15. | D DISK 105 |
| 16. | D DISK 106 |
| 17. | D DISK 107 |
| 18. | D DISK 108 |
| 19. | D DISK 109 |
| 20. | D DISK 110 |
| 21. | D DISK 111 |
| 22. | D DISK 112 |
| 23. | D DISK 113 |
| 24. | D DISK 114 |
| 25. | END |
| 26. | PAUS |
| 27. | PAUS |
| 28. | DPLY A > DISK 104 |
| 29. | DISK 104 LBL DATE LBL |
| 30. | DPLY A' > DISK 105 |
| 31. | DISK 105 LBL TIME LBL |
| 32. | DPLY D' > DISK 111 |
| 33. | DISK 111 LBL LOAD CONV LBL |
| 34. | PAUS |
| 35. | PAUS |
| 36. | DPLY Q1 > DISK 101 |
| 37. | DISK 101 LBL Q1 CURVE LBL |
| 38. | DPLY Q2 > DISK 102 |
| 39. | DISK 102 LBL Q2 CURVE LBL |
| 40. | DPLY Q3 > DISK 103 |
| 41. | DISK 103 LBL Q2 CURVE LBL |
| 42. | PAUS |
| 43. | PAUS |
| 44. | RMS > C' |
| 45. | COOR |
| 46. | C' > R8 |
| 47. | O IF > V |
| 48. | O IF > V' |
| 49. | C' * −1 > C' |
| 50. | GOTO 61 |
| 51. | END |
| 52. | GOTO 119 |
| 53. | END |

| | -continued | |
|---|---|---|
| 54. | O IF > V' | |
| 55. | O IF > V | |
| 56. | C' * −1 > C' | |
| 57. | GOTO 61 | |
| 58. | END | |
| 59. | GOTO 119 | |
| 60. | END | |
| 61. | PAUS | |
| 62. | PAUS | |
| 63. | COOR | |
| 64. | H' - H > D | |
| 65. | PAUS | |
| 66. | PAUS | |
| 67. | COOR | |
| 68. | C'- V > E | |
| 69. | E * D' > E | |
| 70. | PAUS | |
| 71. | PAUS | |
| 72. | COOR | |
| 73. | V' - V > C | |
| 74. | C * D' > C | |
| 75. | PAUS | |
| 76. | PAUS | |
| 77. | RMS > B' | |
| 78. | B' > R9 | |
| 79. | COOR | |
| 80. | O IF > V | |
| 81. | O IF > V' | |
| 82. | B' * −1 > B' | |
| 83. | GOTO 94 | |
| 84. | END | |
| 85. | GOTO 119 | |
| 86. | END | |
| 87. | O IF > V' | |
| 88. | O IF > V | |
| 89. | B' * −1 > B' | |
| 90. | GOTO 94 | |
| 91. | END | |
| 92. | GOTO 119 | |
| 93. | END | |
| 94. | B' * D' > B | |
| 95. | R9 - R8 > RO | |
| 96. | RO * D' > RO | |
| 97. | PAUS | |
| 98. | PAUS | |
| 99. | COOR | |
| 100. | C' - V > E' | |
| 101. | E' * D' > E' | |
| 102. | C' * D' > C' | |
| 103. | DPLY B > DISK 106 | |
| 104. | DISK 106 LABL RUNNG UBS LABL | |
| 105. | DPLY B' > DISK 107 | |
| 106. | DISK 107 LABL RUNNG V LABL | |
| 107. | DPLY C > DISK 108 | |
| 108. | DISK 108 LABL AVA THRST LABL | |
| 109. | DPLY C' > DISK 109 | |
| 110. | DISK 109 LABL PRE HB RMS LABL | |
| 111. | DPLY D > DISK 110 | |
| 112. | DISK 110 LABL TIME O/C LABL | |
| 113. | DPLY E > DISK 112 | |
| 114. | DISK 112 LABL PKHB/RMS LABL | |
| 115. | DPLY E' > DISK 113 | |
| 116. | DISK 113 LABL TTL THRST LABL | |
| 117. | DPLY RO > DISK 114 | |
| 118. | DISK 114 LABL DKNG LD LABL | |
| 119. | END | |

Although only the preferred embodiment of the invention has been described, it is evident that the invention will find uses other than electric motor operated valves. For example, the invention is useful for verifying correct operation of manual, hydraulic, and pneumatic actuated valves.

Whereas, this invention has been described in detail with particular reference to preferred embodiments thereof, it will be understood that variations and modifications can be effected within the spirit and scope of the invention, as described before and as defined in the appended claims.

What is claimed is as follows:

1. Method for determining and evaluating the general material and operational condition of a valve and/or an associated operator thereof said method comprising:
   monitoring a drive system for said operator;
   providing a dynamic valve operator spring pack movement/time trace;
   correlating valve stem load to spring pack movement to provide a valve stem load/time trace;
   providing a motor current/time trace;
   correlating the motor current/time trace with the valve stem load/time trace;
   providing a torque and limit switch on-off/time trace;
   correlating the switch on-off/time trace with the valve stem load/time trace and the motor current/time trace; and
   diagnosing the correlated traces to evaluate the condition of the valve and/or valve operator.

2. Method of claim 1 wherein the step of continously monitoring the operator drive system is accomplished from a remote site isolated from the location of the valve and operator.

3. Method of providing a historical comparison of the general operating condition of a valve and/or valve operator having a motor driven worm shaft, which drives a worm which in turn drives a worm gear, which in turn drives a valve stem to open and close a valve attached to the valve stem, and having a spring pack compressed by movement of the worm, said method of comprising the steps of:
   correlating spring pack movement to valve stem load;
   measuring spring pack movement over given time to develop a correlated stem load/time trace;
   measuring motor current draw over the same given time to develop a motor current/time trace;
   detecting switch positions of respective torque switches and limit switches over the same given time to develop a switch position/time trace;
   analyzing and comparing the stem load/time trace, motor current/time trace, and switch position/time trace to evaluate the relative condition of the valve and/or valve operator.

4. Method of claim 3, wherein the steps of measuring, detecting, and analyzing and comparing are accomplished from a remote site isolated from the location of the valve and operator.

5. Method for determining and evaluating the general material and operational condition of a valve and/or an associated operator thereof, said method comprising:
   monitoring a drive system for said operator over a period of time by thereduring measuring and recording valve stem load, a spring pack reaction to the worm, an electrical operating characteristic of the motor, and torque and/or limit switch position;
   providing a first parameter/time trace in which the parameter is one of either valve stem load or spring pack movement or motor current or torque and limit switch position;
   providing a second parameter/time trace in which the parameter is one of the aforestated;
   correlating the first parameter/time trace with the second parameter/time trace; and
   diagnosing the correlated traces to evaluate the condition of the valve and/or valve operator.

6. Method of claim 5, further comprising the steps of:
   providing a third parameter/time trace in which the parameter is one of the aforestated; and correlating the first, second and third parameter/time traces with one another.

7. Method for determining and evaluating the general material and operational condition of a valve and/or an associated operator thereof, said method comprising the steps of:
monitoring a drive system for said operator over a period of time;
providing a dynamic valve operator spring pack movement/time trace;
correlating valve stem load to spring pack movement to provide a valve stem load/time trace; and
diagnosing the load/time trace to evaluate the condition of the valve and/or valve operator.

8. Method of claim 7, further comprising the steps of:
providing a torque and limit switch on-off/time trace;
correlating the switch on-off/time trace with the stem load/time trace; and
diagnosing the correlated traces to evaluate the condition of the valve and/or valve operator.

9. Method of claim 7, further comprising the steps of:
providing a motor current/time trace;
correlating the current/time trace to the stem load/time trace; and
diagnosing the correlated traces to evaluate the condition of the valve and/or valve operator.

10. Method for determining and evaluating the general material and operational condition of a valve and/or an associated operator thereof, having a driven worm shaft, which drives a worm which in turn drives a worm gear, which in turn drives a valve stem to open and close a valve attached to the valve stem, and having a spring pack compressed by movement of the worm, said method, comprising the steps of:
operating the valve operator to drive the valve stem;
inducing test loads into the valve operator by imposed resistance to movement of the valve stem;
measuring the test loads induced into the valve operator;
measuring reaction of the spring pack to the test loads induced into the valve operator;
correlating the measured test loads to the measured reaction of the spring pack to the test loads, and calibrating the spring pack reaction relative to the measured loads;
operating the valve operator over a monitored period of time, whereby unmeasured operating loads are induced into the valve operator by resistance to valve stem movement during valve-in-use conditions;
measuring reaction of the spring pack during the monitored period of time; and
deriving a representation of the unmeasured operating loads in response to measuring of the spring pack reaction.

11. Method of claim 10, wherein the step of inducing test loads into the valve operator comprises the steps of:
blocking the lineal movement of the valve stem; and
continuing to drive the valve stem by operation of the valve operator;
whereby forces exerted by the worm shaft progressively increase.

12. Method of claim 10, wherein the step of measuring the test loads comprises the steps of measuring the resistance forces imposed on the valve stem.

13. Method of claim 10, wherein the spring pack reaction measured and correlated is the lineal motion of the spring pack as the spring pack is compressed by the worm.

14. Method of claim 10, wherein the step of inducing test loads into the valve operator comprises the step of inducing test loads on the worm of the valve operator by imposing resistance to movement of the valve stem.

15. Method of claim 10, wherein the step of deriving a representation of the unmeasured operating loads comprises the step of deriving a time related trace of the unmeasured operating loads in response to measuring of the spring pack reaction, and further comprising the step of diagnosing the time related trace of the unmeasured operating loads to evaluate the condition of the valve and/or valve operator.

16. Method for determining and evaluating the general material and operational condition of a valve and/or an associated operator thereof, having a driven worm shaft, which drives a worm which in turn drives a worm gear, which in turn drives a valve stem to open and close a valve attached to the valve stem, and having a spring pack compressed by movement of the worm, said method comprising the steps of:
imposing a test load on the valve stem;
measuring the test load imposed on the valve stem;
observing a worm reaction parameter in response to the test load imposed on the valve stem;
measuring the worm reaction parameter;
calibrating the worm reaction parameter relative to the imposed test load on the valve stem;
operating the valve operator over a monitored period of time, whereby unmeasured stem loads are experienced affecting the valve stem;
measuring the worm reaction parameter over the monitored period of time;
deriving a time related trace of unmeasured stem loads over the monitored period of time in response to the measuring of the worm reaction parameter; and
diagnosing the time related trace of the stem loads to evaluate the condition of the valve and/or valve operator.

17. Method of claim 16, wherein the worm reaction parameter observed, measured and calibrated is a displacement parameter relating to lineal movement of the worm; and the step of measuring the worm reaction parameter includes the step of measuring the linear motion of the operator spring pack over the monitored period of time.

18. Method of claim 17, wherein the step of deriving a time related trace of the unmeasured stem loads includes the steps of:
providing a time related trace of the spring pack motion over the monitored period of time; and
correlating the spring pack motion over the monitored period to the calibrated spring pack motion and test loads to derive a time related trace of stem loads over the monitored period.

19. Method of claim 16, further comprising the steps of:
measuring operator motor current draw over the monitored period of time;
providing a time related trace of the motor current over the monitored period of time;
correlating the time related trace of the motor current to the time related trace of the stem loads; and
diagnosing the correlated traces to evaluate the condition of the valve and/or valve operator.

20. Method of claim 16, further comprising the steps of:
  measuring the switch positions of the respective operator torque switches and limit switches over the monitored period of time;
  providing a time related trace of the switch positions over the monitored period of time;
  comparing and analyzing the time related trace of the switch positions to the time related trace of the stem loads to evaluate the condition of the valve and/or valve operator.

21. Method for determining and evaluating the general, material and operational condition of a valve and/or an associated operator thereof having an operator drive system which drives a valve stem to open and close the valve and also including a spring pack compressible by the drive system, said method comprising the steps of:
  monitoring the operator drive system over a period of time;
  providing a dynamic time related trace of the valve operator spring pack action;
  correlating valve stem load to spring pack action;
  deriving a time related trace of unmeasured stem loads over the given period of time; and
  diagnosing the time related trace of the stem loads to evaluate the condition of the valve and/or valve operator.

22. Method of claim 21, wherein the step of providing a dynamic time related trace of the valve operator spring pack action comprises the steps of:
  measuring deflection of the operator spring pack over the period of time, as the spring pack is compressed by a worm included as part of the drive system; and
  providing a time related trace of the spring pack deflection.

23. Method of claim 21, further comprising the steps of:
  providing a torque and limit switch on-off/time trace;
  correlating the switch on-off/time trace with the stem load/time trace; and
  diagnosing the correlated traces to evaluate the condition of the valve and/or valve operator.

24. Method of claim 21, further comprising the steps of:
  providing a motor current/time trace;
  correlating the current/time trace to the stem load/time trace; and
  diagnosing the correlated traces to evaluate the condition of the valve and/or valve operator.

25. Method for determining and evaluating the general material and operational condition of a valve and/or an associated operator thereof, having a driven worm shaft, which drives a worm which in turn drives a worm gear, which in turn drives a valve stem to open and close a valve attached to the valve stem, and having a spring pack compressed by movement of the worm, said method comprising the steps of:
  operating the valve operator to drive the valve stem over a period of time;
  developing loads within the valve operator;
  measuring the developed loads within the valve operator;
  measuring displacement of the spring pack in reaction to the developed loads;
  calibrating the spring pack displacement to the developed loads;
  deriving a time related history of unmeasured loads in response to measuring the spring pack deflection.

26. Method of claim 25, wherein the step of developing loads within the valve operator includes the step of imposing resistance to movement of the valve stem.

27. Method of claim 25, wherein the step of developing loads within the valve operator includes developing loads on the worm.

28. Method of claim 25, further comprising the steps of:
  recording a time related trace of the stem load; and
  diagnosing the time related trace of the stem load to evaluate the condition of the valve and/or valve operator.

29. Method for determining and evaluating the general material and operational condition of a valve and/or an associated operator thereof, having a driven worm shaft, which drives a worm which in turn drives a worm gear, which in turn drives a valve stem to open and close a valve attached to the valve stem, and having a spring back compressed by movement of the worm, said method comprising the steps of:
  monitoring the operation of the valve operator over a period of time;
  measuring displacement of the spring pack during the operation of the valve operator over the period of time;
  providing a time related trace of the spring pack displacement; and
  diagnosing the time related trace of the spring pack movement to evaluate the condition of the valve and/or valve operator.

30. Method for determining and evaluating the general material and operational condition of a valve and/or an associated operator thereof, having a driven worm shaft, which drives a worm which in turn drives a worm gear, which in turn drives a valve stem to open and close a valve attached to the valve stem, and having a spring pack compressed by action of the worm, said method comprising the steps of:
  monitoring the operator drive system over a period of time by thereduring monitoring and recording reaction of the spring pack to action of the worm;
  providing a first parameter/time trace in which the parameter is spring pack reaction to action of the worm;
  providing a second parameter/time trace in which the parameter is one of either valve stem load, or motor current, or torque and limit switch positions;
  correlating the first parameter/time trace with the second parameter/time trace; and
  diagnosing the correlated traces to evaluate the condition of the valve and/or valve operator.

31. Method of claim 30 further comprising the steps of:
  providing a third parameter/time trace in which the parameter is one of either valve stem load, or motor current, or torque and limit switch positions; and
  correlating the first, second and third parameter/time traces with one another.

32. Method of claim 30, wherein the spring pack reaction which is monitored, recorded and traced with respect to time is the movement of the spring pack as the spring pack is compressed by action of the worm.

* * * * *

UNITED STATES PATENT AND TRADEMARK OFFICE
CERTIFICATE OF CORRECTION

PATENT NO. : 4,690,003
DATED : Sep. 1, 1987
INVENTOR(S) : John A. McNemmany, Steven Nafziger It is certified that error appears in the above-identified patent and that said Letters Patent is hereby corrected as shown below:     Title page:

Inventors:  CHARBONNEAU ET AL

[75] Inventors:   Arthur G. Charbonneau, Marietta;
Dwaine A. Godfrey, Fulton;
John A. McMennamy, Cobb;
Steven Nafziger, Gwinnett
all of Georgia.

Signed and Sealed this

Fourteenth Day of June, 1988

Attest:

DONALD J. QUIGG

*Attesting Officer*     *Commissioner of Patents and Trademarks*